(12) United States Patent
Zhang et al.

(10) Patent No.: US 8,265,044 B2
(45) Date of Patent: Sep. 11, 2012

(54) METHOD, SYSTEM AND BASE STATION USING FRAME CONFIGURATION WHICH SUPPORTS RELAY FOR WIRELESS TRANSMISSION

(75) Inventors: Guanghui Zhang, Beijing (CN); Yongbin Xie, Beijing (CN); Yingmin Wang, Beijing (CN); Shaohui Sun, Beijing (CN); Yang Yu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 336 days.

(21) Appl. No.: 12/668,292

(22) PCT Filed: Jul. 8, 2008

(86) PCT No.: PCT/CN2008/071578
§ 371 (c)(1),
(2), (4) Date: Jan. 8, 2010

(87) PCT Pub. No.: WO2009/006840
PCT Pub. Date: Jan. 15, 2009

(65) Prior Publication Data
US 2010/0189081 A1    Jul. 29, 2010

(30) Foreign Application Priority Data
Jul. 9, 2007   (CN) .......................... 2007 1 0118573

(51) Int. Cl.
*H04J 3/00* (2006.01)

(52) U.S. Cl. ..................................................... 370/336

(58) Field of Classification Search .................. 370/203, 370/204–215, 229–240, 310–337, 338–350, 370/395.1, 395.3, 395.4, 395.41, 395.42, 370/395.5, 395.52, 395.53, 412–421, 431–457, 370/458–463, 464–497, 498–522, 523–520, 370/521–529
See application file for complete search history.

(56) References Cited

U.S. PATENT DOCUMENTS

| | | | | |
|---|---|---|---|---|
| 7,826,541 B2 * | 11/2010 | Fujii et al. | ...................... | 375/260 |
| 7,920,826 B2 * | 4/2011 | Kim et al. | ...................... | 455/16 |
| 7,970,347 B2 * | 6/2011 | Hart et al. | ...................... | 455/13.1 |
| 7,986,645 B2 * | 7/2011 | Yu et al. | ...................... | 370/279 |
| 7,990,906 B2 * | 8/2011 | Viorel et al. | ...................... | 370/315 |
| 8,005,051 B2 * | 8/2011 | Watanabe | ...................... | 370/335 |
| 8,014,338 B2 * | 9/2011 | Lee et al. | ...................... | 370/324 |
| 8,031,604 B2 * | 10/2011 | Sydir et al. | ...................... | 370/235 |

(Continued)

FOREIGN PATENT DOCUMENTS

CN    1714587 A    12/2005
(Continued)

*Primary Examiner* — Kwang B Yao
*Assistant Examiner* — Jung-Jen Liu
(74) *Attorney, Agent, or Firm* — Occhiuti Rohlicek & Tsao LLP

(57) ABSTRACT

A method using a frame structure which supports relay for wireless transmission, which divides the time slots of a sub-frame into some zones, in which the data is transmitted using the manner of TDD, wherein further including that at least one time slot in a sub-frame is set as a hybrid zone; the transmission of the data is realized through frequency division multiplexing the access link and relay link in the hybrid zone of the sub-frame; and also the multi-hop relay is supported under the two work manners of relay in sub-frame and relay in frame.

11 Claims, 7 Drawing Sheets

U.S. PATENT DOCUMENTS

| | | | |
|---|---|---|---|
| 8,040,826 B2 * | 10/2011 | Lee et al. | 370/293 |
| 2006/0285505 A1 | 12/2006 | Cho et al. | |
| 2007/0072604 A1 * | 3/2007 | Wang | 455/428 |
| 2007/0081502 A1 * | 4/2007 | Lee et al. | 370/337 |
| 2007/0104223 A1 * | 5/2007 | Lee et al. | 370/470 |
| 2010/0189081 A1 * | 7/2010 | Zhang et al. | 370/336 |

FOREIGN PATENT DOCUMENTS

| | | |
|---|---|---|
| CN | 1960207 A | 5/2007 |
| CN | 1960209 A | 5/2007 |

* cited by examiner

METHOD, SYSTEM AND BASE STATION USING FRAME CONFIGURATION WHICH SUPPORTS RELAY FOR WIRELESS TRANSMISSION

CROSS-REFERENCE TO RELATED APPLICATIONS

This application is the National Stage of International Application No. PCT/CN2008/071578, filed on Jul. 8, 2008, which claims the priority to Chinese Patent Application No. 200710118573.4, filed with the Chinese Patent Office on Jul. 9, 2007 and entitled "METHOD FOR WIRELESS TRANSMISSION BY USING FRAME STRUCTURE SUPPORTING RELAY AND SYSTEM THEREOF", which is hereby incorporated by reference in its entirety.

FIELD OF THE INVENTION

The present invention relates to the technical field of wireless communication and particularly to a method for wireless transmission by using a frame structure supporting relay, a system and a base station thereof.

BACKGROUND OF THE INVENTION

In the 3rd Generation (3G) and the Beyond 3rd Generation (B3G) communication systems, the coverage area is an important aspect for a wireless access system, and the wireless access system performs coverage of its service area generally through base stations or access points. However, a mobile station may quite possibly locate outside the service area and can not therefore share the wireless access service due to its mobility. Even if the UE locates in the service area, the signal transmission may be possibly obstructed by obstacles on transmission paths, which reduces the Quality of Service. In addition, very high speed data (e.g., 1 Gbps) shall be transmitted in future mobile communication systems, and it is extremely possible that a high communication frequency (e.g., 5 GHz) is utilized in the future mobile communication systems due to the limitation of frequency band allocation. These two factors may cause a sharp reduction of the coverage area, and the number of base stations/access points may influence construction and operating cost of the network to a large extent.

In consideration of the above, the Relay or Relay Station (RS) technology is generally proposed in the future mobile communication technical solution in order to address the seamless coverage of service area and the increasing of system capacity and to save the cost as soon as possible. If a UE locates outside the service area or the quality of signal can not meet the requirements, the signal may be relayed by a RS to implement extension of the service area or improve transmission reliability, i.e., the main function of the Relay is to extend the coverage area and the cell capacity. A basic structure of the Relay may be depicted in FIG. 1. In FIG. 1, if the RS transmits independent synchronization and control information, the RS is called a non-transparent relay, otherwise the RS is called a transparent relay.

In the conventional art, in order to keep a strong compatibility with the conventional 3G (mainly the TD-SCDMA), a frame structure of B3G is illustrated in FIG. 2. In addition, in order to keep a strong compatibility with the conventional 3G (mainly the TD-SCDMA), a frame structure of the Long term evolution time division duplex (LTE TDD) is illustrated in FIG. 3. In order to support the relay, a downlink subframe and an uplink subframe are generally divided into Access Zones and Relay Zones respectively in the TDD system, as particularly illustrated in FIG. 4.

However, the above TDD system supporting the Relay frame structure has the following apparent disadvantages if it is applied to the B3G technology:

(1) Increasing the delay. Taking a BS transmitting downlink traffic as an example: when the downlink traffic arrives at the BS, the BS may transmit the downlink traffic at the beginning time of a downlink subframe in the original system frame structure. However, the BS may transmit the downlink traffic only in the DownLink (DL) Access Zone of the B3G frame structure supporting Relay, which increases the delay virtually and makes it difficult to meet the rigorous requirements for delay in B3G, as particularly illustrated in FIG. 5.

(2) Wasting resource. In the case that traffic is little and little bandwidth is required in a relay link, bandwidth in the whole Relay zone shall be allocated to the relay link if the original frame structure supporting Relay is utilized for data transmission, which may cause a severe resource wasting, as particularly illustrated in FIG. 6.

SUMMARY OF THE INVENTION

In view of this, an embodiment of the present invention provides a method for wireless transmission by using a frame structure supporting Relay, a system and a base station thereof, which utilizes frequency resource and time resource effectively, decreases delay and increases the utilization ratio of resource.

Accordingly, the technical solution according to an embodiment of the present invention is described as follows.

A method for wireless transmission by using a frame structure supporting Relay, wherein time slots of a subframe is divided into a plurality of zones, and a time division multiplex manner is utilized for data transmission, and the method further includes:

setting at least one time slot in the subframe as a hybrid zone; and performing data transmission in a frequency division multiplex manner in the hybrid zone.

A system for wireless transmission by using a frame structure supporting Relay, includes a base station, a relay and user equipment, wherein in the downlink direction, the base station transmits data in a specific downlink time slot to the user equipment and the relay respectively in a frequency division multiplex manner;

in the uplink direction, the user equipment transmits data to the relay, the relay transmits data in a specific uplink time slot to the base station at a frequency allocated by the base station, and the user equipment transmits data that is frequency division multiplexed in the relay to the base station in the specific uplink time slot.

A base station, including: a setting unit, a transmitting unit and a receiving unit, wherein the setting unit is configured to set at least one time slot of a subframe as a hybrid zone;

the transmitting unit is configured to transmit data in a hybrid zone of a downlink subframe to user equipment and a relay in a frequency division multiplex manner; and the receiving unit is configured to receive data sent from the relay or data that is frequency division multiplexed by the relay and the user equipment in a hybrid zone of an uplink subframe.

It can be seen that with the method, the system and the base station according to embodiments of the present invention, the broad bandwidth of the B3G system is sufficiently utilized. At least one time slot of a subframe is set as a hybrid zone and data transmission is performed via frequency division multiplex of the access link and the relay link in the Hybrid Zone of the subframe, which not only improves flexibility of the system but also sufficiently utilizes time and frequency resource of the system, decreases delay, and supports non-transparent, transparent and multi-hop relay in compatibility with the TD_SCDMA system. Also, such an order can decrease payload of the system sufficiently, increase the utilization ratio of resource, and ensure sufficient time for transmit-to-receive and receive-to-transmit transition for the UE.

DETAILED DESCRIPTION OF THE INVENTION

The basic idea of an embodiment of the present invention lies in that a manner combining time division multiplex and frequency division multiplex in a broadband TDD system, which can implement feasible granularity and flexibility and effectiveness of resource scheduling.

Figure 1:
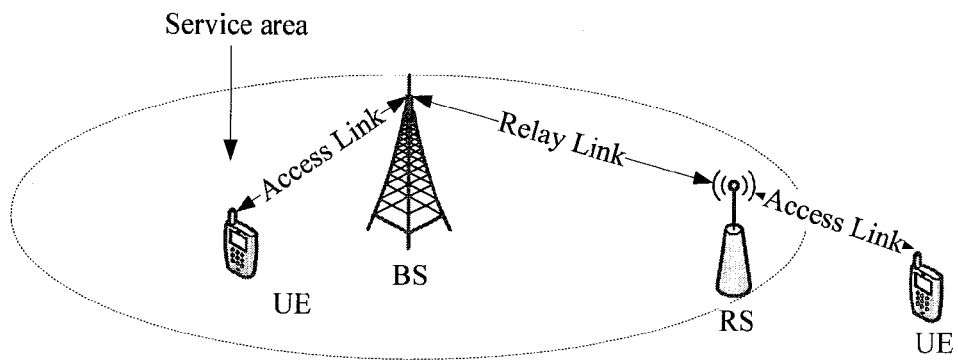
FIG. 1 is a basic structural diagram of a Relay system in the conventional art.
Figure 2:
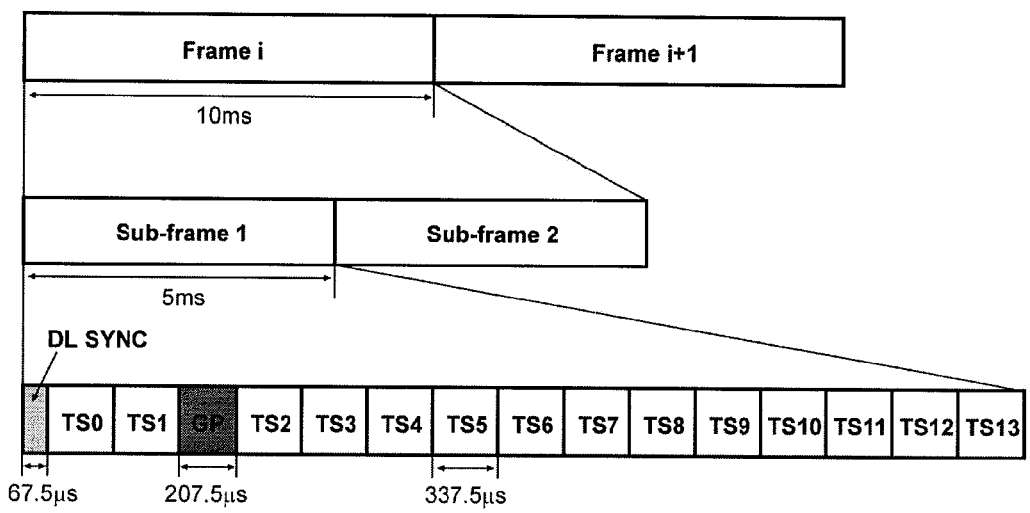
FIG. 2 is a diagram of a B3G frame structure compatible with TD-SCDMA in the conventional art.
Figure 3:
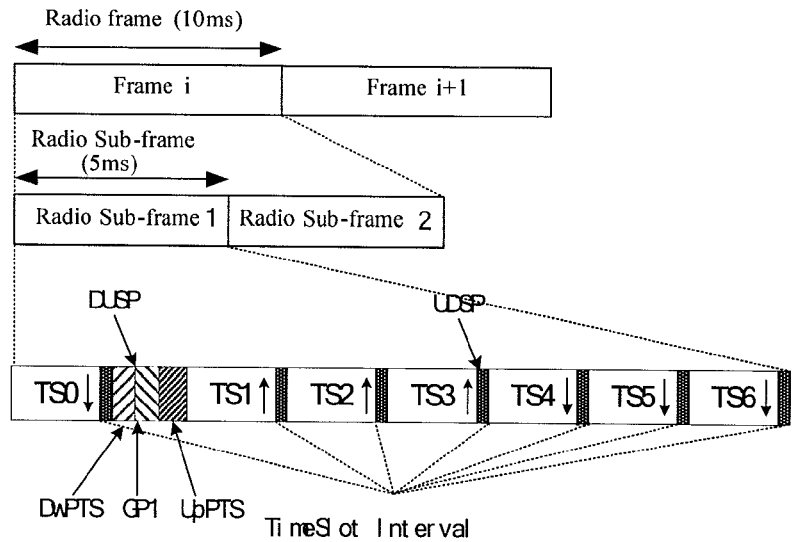
FIG. 3 is a diagram of a LTE TDD frame structure compatible with TD-SCDMA in the conventional art.
Figure 4:
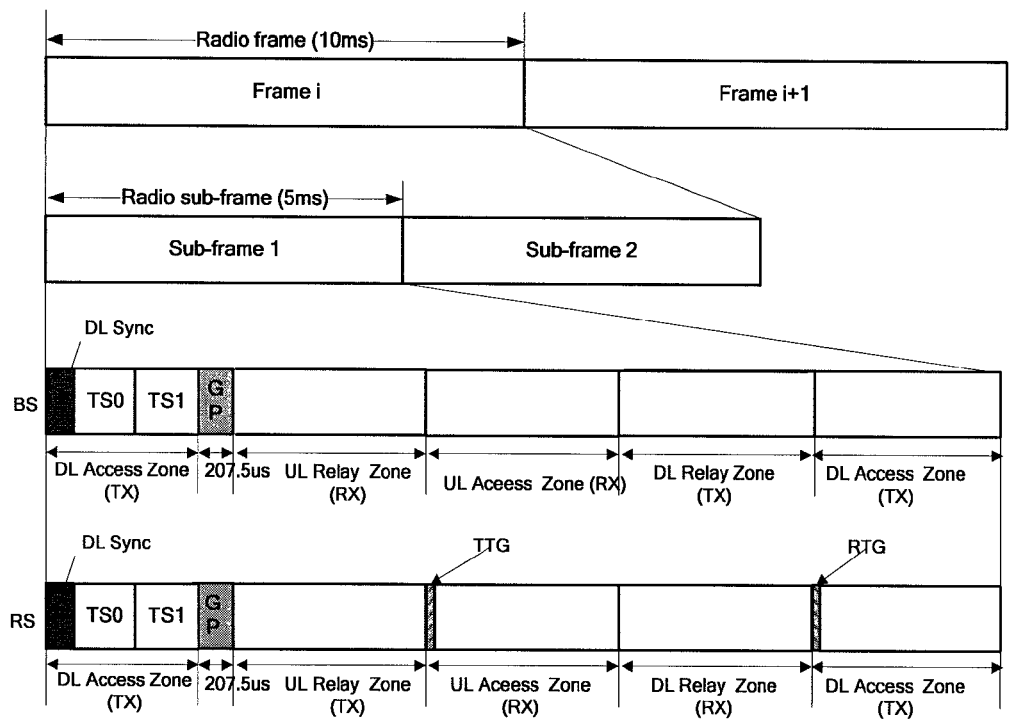
FIG. 4 is a diagram of a TDD system frame structure supporting relay in the conventional art.
Figure 5:
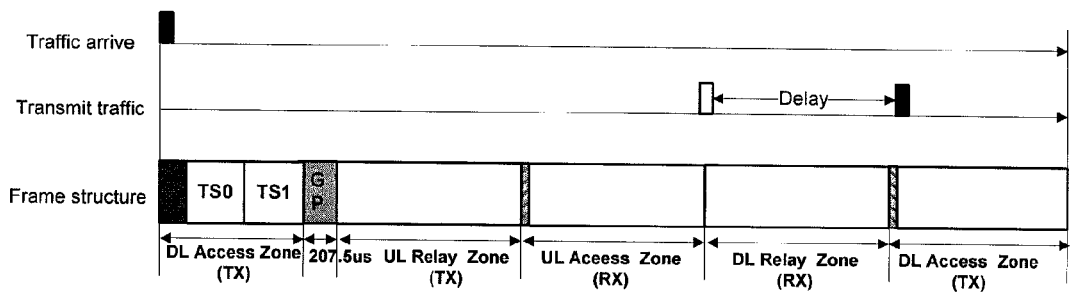
FIG. 5 is a diagram of a TDD system frame structure supporting relay with increased delay in the conventional art.
Figure 6:
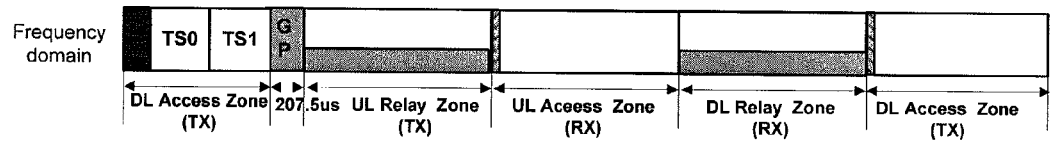
FIG. 6 is a diagram of a TDD system frame structure supporting relay with wasted resource in the conventional art.
Figure 7:
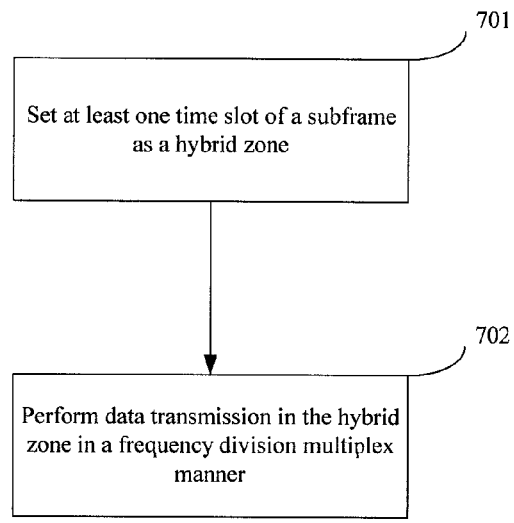
FIG. 7 is a flow chart of a method according to an embodiment of the present invention.

In order to make those skilled in the art better understand the technical solution according to embodiments of the present invention, the present invention is described in detail hereinafter with reference to the attached drawings and the embodiments. As illustrated in FIG. 7, a method according to an embodiment of the present invention includes:

Step 701: Setting at least one time slot in a subframe as a hybrid zone; and

Step 702: Performing data transmission in a frequency division multiplex manner in the hybrid zone.

In particular, in the B3G frame structure according to the conventional art, each frame, 10 ms, is divided into two 5 ms subframes, and each subframe includes one DownLink Synchronization timeslot (DL SYNC timeslot) and 14 data time slots. In an embodiment of the present invention, in order to support Relay, the B3G frame structure is divided into different zones for supporting transparent relay and non-transparent relay respectively.

Figure 8:
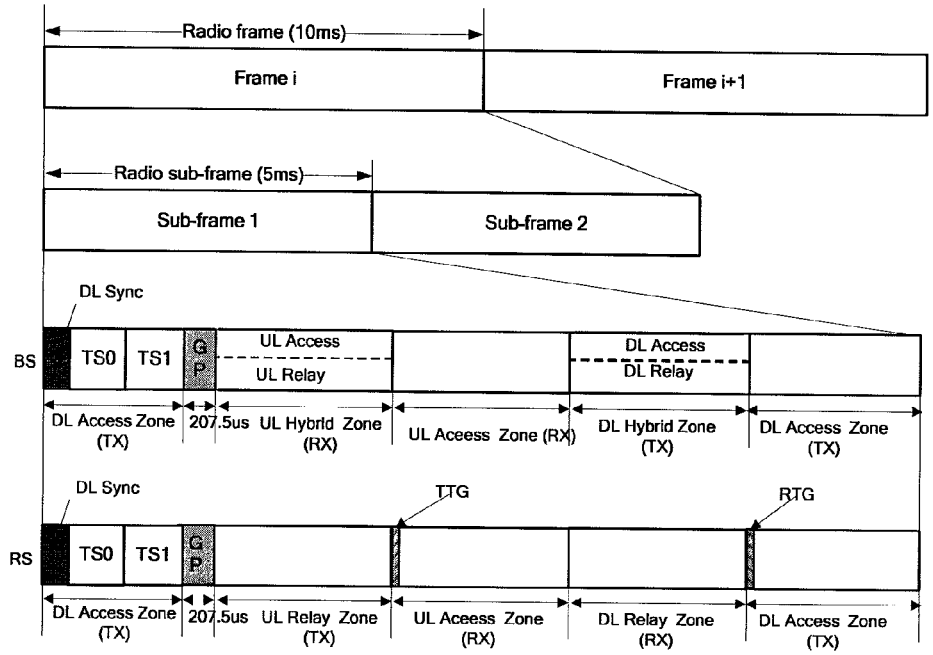
FIG. 8 is a diagram of a TDD frame structure supporting inband non-transparent relay according to an embodiment of the present invention.

For the non-transparent relay as illustrated in FIG. 8, for a Base Station (BS), Hybrid Zones are set in each subframe, i.e., the Hybrid Zones replace the Relay Zones. Therefore, each subframe is composed of a first DownLink (DL) Access Zone, an UpLink (UL) Hybrid Zone, an UpLink (UL) Access Zone, a DownLink (DL) Hybrid Zone, and a second DownLink (DL) Access Zone. The first DL Access Zone is composed of a DL SYNC time slot, TS0 and TS1, and any of other zones is composed of one or more remaining time slots. In the first DL Access Zone, the BS may transmit synchronization information and control information. In the UL Hybrid Zone, the UE and the RS may transmit data to the BS simultaneously in a FDM manner, and in the UL Access Zone, only the UE may transmit data to the BS. In the DL Hybrid Zone, the BS may transmit data to the UE and the RS simultaneously in a FDM manner, and in the second DL Access Zone, the BS may only transmit data to the UE. The BS may also transmit synchronization information and control information in the DL Hybrid Zone to the RS. A GP between the first DL Access Zone and the UL Hybrid Zone is a transit point from downlink to uplink.

For a relay, each subframe is composed of a first DL Access Zone, an UpLink (UL) Relay Zone, a UL Access Zone, a DownLink (DL) Relay Zone and a DL Access Zone. The first DL Access Zone is composed of a DL SYNC time slot, TS0 and TS1, and any of other zones is composed of one or more remaining time slots. In the first DL Access Zone, the RS may transmit its own synchronization information and control information. In the UL Relay Zone, the RS forwards data from the UE to the BS, and the UE may transmit data in the UL Access Zone to its home RS. In the DL Relay Zone, the RS may receive data from the BS and forward the data in the second DL Access Zone to the UE. A GP between the first DL Access Zone and the UL Relay Zone is a transit point from downlink to uplink. A transmit/receive transition gap (TTG) exists between the UL Relay Zone and the UL Access Zone, and a receive/transmit transition gap (RTG) exists between the DL Relay Zone and the second DL Access Zone.

Figure 9:
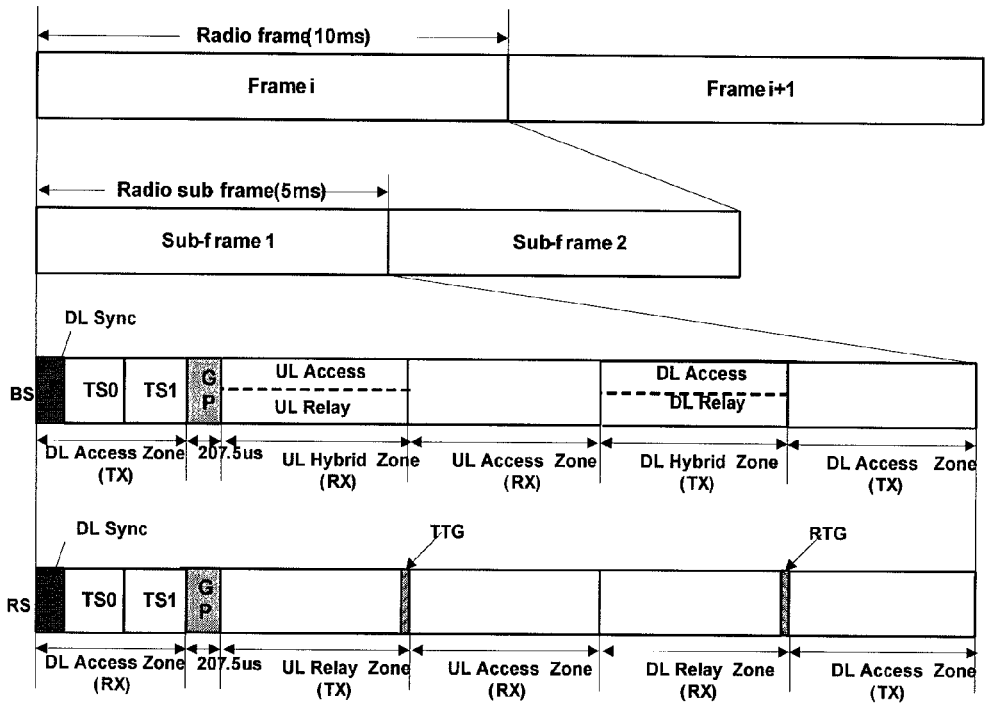
FIG. 9 is a diagram of a TDD frame structure supporting inband transparent relay according to an embodiment of the present invention.

A frame structure supporting transparent relay is similar to that supporting non-transparent relay, as illustrated in FIG. 9. Hybrid Zones are set in each subframe, i.e., the Hybrid Zones replace the Relay Zones. Therefore, for a BS supporting inband transparent relay, each subframe is composed of a first DL Access Zone, a UL Hybrid Zone, a UL Access Zone, a DL Hybrid Zone and a DL Access Zone. The first DL Access Zone is composed of a DL SYNC time slot, TS0 and TS1, and any of other zones is composed of one or more remaining time slots. In the first DL Access Zone, the BS may transmit synchronization information and control information. In the UL Hybrid Zone, the UE and the RS may transmit data to the BS simultaneously in a Frequency division multiple (FDM) manner, and only the UE may transmit data in the UL Access Zone to the BS. In the DL Hybrid Zone, the BS may transmit data to the UE and the RS simultaneously in a FDM manner, and the BS may only transmit data in a second DL Access Zone to the UE. A GP between the first DL Access Zone and the UL Access Zone is a transit point from downlink to uplink.

Also, the second DL Access Zone may be replaced with a downlink transparent zone, so that the inband transparent relay can implement the function of cooperative relay.

Figure 12:
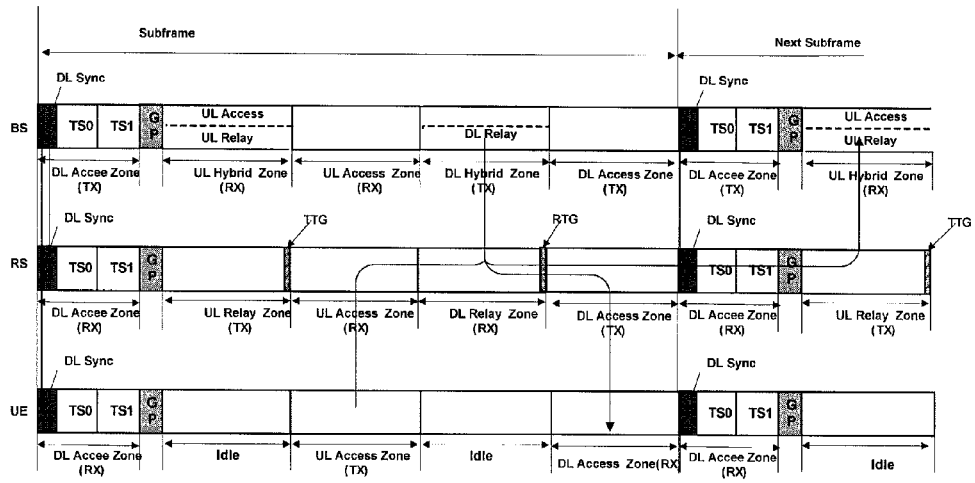
FIG. 12 is a flow diagram of a signal supporting inband transparent relay according to an embodiment of the present invention.

For an inband transparent relay, each subframe is composed of a first DL Access Zone, a UL Access Zone, a UL Relay Zone, a DL Access Zone and a DL Relay Zone. The first DL Access Zone is composed of a DL SYNC time slot, TS0 and TS1, and any of other zones is composed of one or more remaining time slots. In the first DL Access Zone, the RS receives synchronization information and control information from the BS. In the UL Relay Zone, the RS forwards data from the UE to the BS, and the UE may transmit data in the UL Access Zone to its home RS. In the DL Relay Zone, the RS may receive data from the BS, and forwards the data in a second DL Access Zone to the UE. A flow chart of signal is illustrated in FIG. 12. A GP between the first DL Access Zone and the UL Access Zone is a transit point from downlink to uplink. A RTG exists between the UL Access Zone and the UL Relay Zone, and a TTG exists between the second DL Access Zone and the DL Relay Zone.

With the above frame structure, the time division multiplex is utilized between zones, however, the frequency division multiplex is utilized in the UL Hybrid Zone and the DL Hybrid Zone in the relay link and the access link. Also, allocation of frequency domain resource in the relay link and the access link in respective time slots of the Hybrid Zones may be different from each other, which depends on scheduling. In the case that traffic in the relay link is little, i.e., the relay does not need to occupy a large bandwidth, a part of frequency resource from the UL Hybrid Zone or the DL Hybrid Zone may be allocated to the UE, and it is therefore avoided resource wasting caused by allocation of all bandwidth of a time slot to the relay link. Also, the utilization of frequency multiplex improves the flexibility of scheduling system resource. With the above frame structure, a smaller granularity of resource scheduling and a decreased delay can be implemented.

Figure 10:
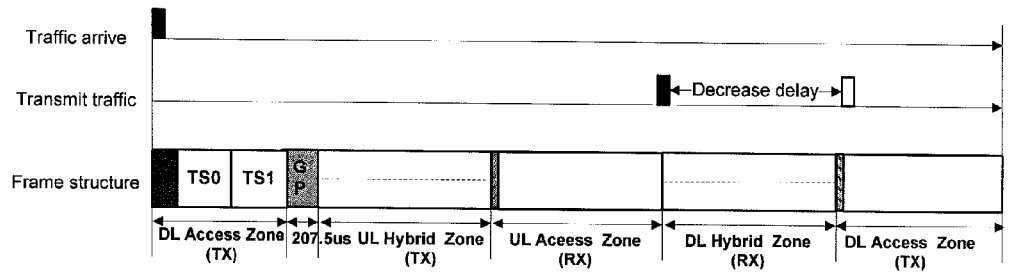
FIG. 10 is a diagram of a frame structure supporting frequency division multiplex of a relay link and an access link with decreased delay according to an embodiment of the present invention.

Particularly, as illustrated in FIG. 10, taking a BS transmitting downlink traffic as an example: when the downlink traffic arrives at the BS, because the frequency division multiplex is utilized in the relay link and the access link in the Hybrid zones, the BS may transmit data to the UE in Hybrid Zones of a downlink subframe in the system frame structure supporting Hybrid Zone, the transmitting time being equal to that of a frame structure that does not support relay. Therefore, the delay is not increased.

Figure 11:
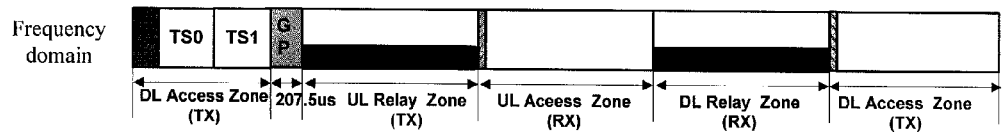
FIG. 11 is a diagram of a frame structure supporting frequency division multiplexing of a relay link and an access link with feasible resource allocation according to an embodiment of the present invention.

Also, as illustrated in FIG. 11, in the case that traffic in the relay link is little and little bandwidth is required, a part of bandwidth of the Hybrid Zones may be allocated to the relay link by using the frame structure supporting frequency division multiplex in the relay link and the access link, thereby decreasing resource wasting.

Figure 13:
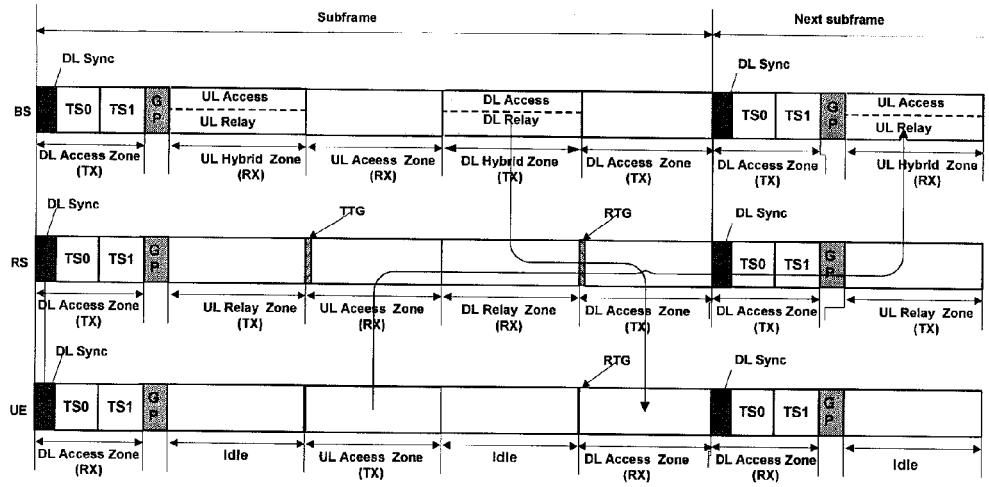
FIG. 13 is a flow diagram of a signal supporting inband non-transparent relay according to an embodiment of the present invention.

Correspondingly, as illustrated in FIG. 12 and FIG. 13, the operation of the system using the above frame structure is depicted as follows: in the downlink direction, the BS transmits data in the DL Hybrid Zone to the UE and the RS in the coverage area of the BS respectively in a FDM manner, the RS demodulates and decodes the data from the BS upon receiving the data at a corresponding frequency resource, determines a corresponding destination address, encodes and modulates the data in a proper position of the DL Access Zone, and then forwards the data to a corresponding UE; in the uplink direction, the UE transmits data in the UL Access Zone to the RS, the RS demodulates and decodes the data from the BS upon receipt, determines a corresponding destination address, and transmits the data to the BS in the frequency resource allocated by the BS to the RS in the UL Hybrid Zone, and in the UL Hybrid Zone, the UE also transmits data to the BS in a frequency division multiplex manner with the RS. The transparent relay receives synchronization information and control information from the BS in the first DL Access Zone, and the non-transparent relay receives synchronization information and control information from the BS in the DL Relay Zone.

In addition, if a system includes a plurality of relays, the RS needs a plurality of Relay Zones operating in a transmitting or receiving mode in order to support multi-hop. An embodiment of the present invention provides two approaches for supporting multi-hop relay: an intra-subframe relay and an intra-frame relay. Each RS may operate in either of the approaches but not necessarily operate in the two approaches simultaneously.

Figure 14:
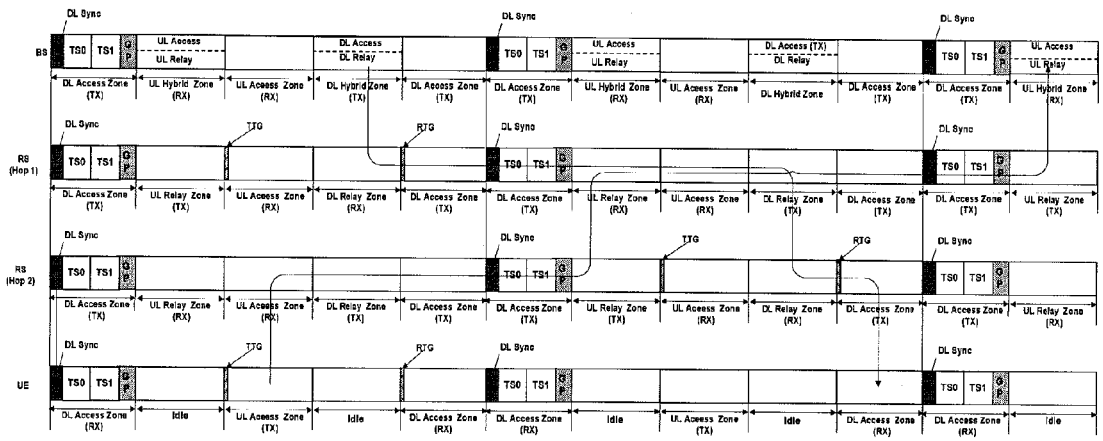
FIG. 14 is a flow diagram of a signal supporting multi-hop relay in the first approach according to an embodiment of the present invention.

Particularly, as illustrated in FIG. 14, the first approach, i.e., the intra-subframe relay, allows the BS or RS to transmit, receive or be idle in the Relay Zone. In the downlink direction, an odd hop RS transmits data in the DL Relay Zone of an even subframe to a next hop RS, and the BS and an even hop RS transmits data in the DL Relay Zone of an odd subframe to a next hop RS. In the uplink direction, an odd hop RS transmits data in the UL Relay Zone of an odd subframe to a back hop RS (or BS), and an even hop RS transmits data in the UL Relay Zone of an even subframe to a back hop RS. For the odd hop RS, a TTG exists between the UL Relay Zone and the UL Access Zone of the odd subframe, and a RTG exists between the DL Relay Zone and the DL Access Zone of the odd subframe. For the even hop RS, a TTG exists between the UL Relay Zone and the UL Access Zone of the even subframe, and a RTG exists between the DL Relay Zone and a second DL Access Zone of the even subframe.

Figure 15:
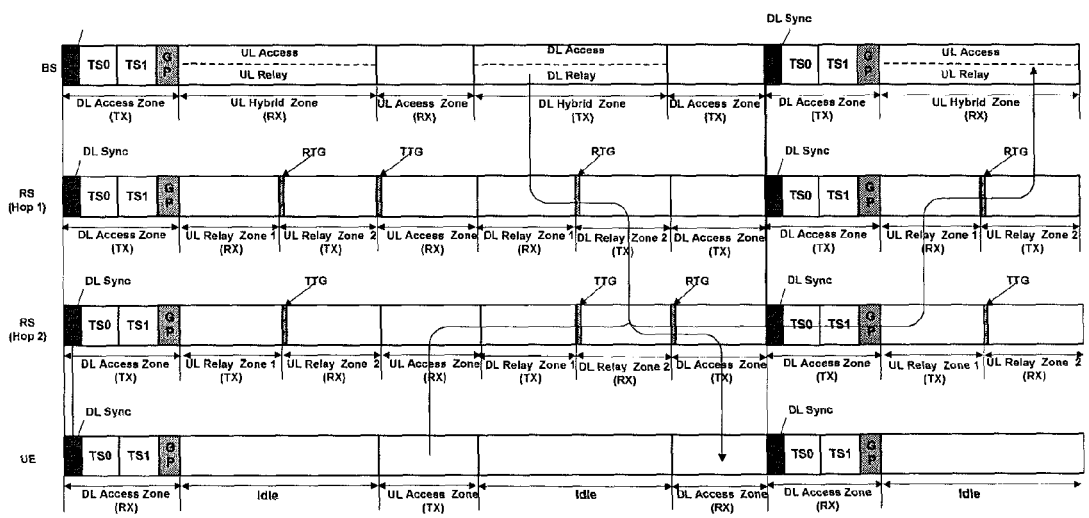
FIG. 15 is a flow diagram of a signal supporting multi-hop relay in the second approach according to an embodiment of the present invention.

Particularly, as illustrated in FIG. 15, the second approach, i.e., the intra-frame relay, allows multi-hop relay in a single subframe. In the uplink direction, an odd hop RS transmits data in the UL Relay Zone 2 to a back hop RS or BS, and an even hop RS transmits data in the UL Relay Zone 1 to a back hop RS. In the downlink direction, an even hop RS (or BS) transmits data in the DL Relay Zone 1 (or the DL Hybrid Zone) to a next hop RS, and an odd hop RS transmits data in the DL Relay Zone 2 to a next hop RS. For the odd hop RS, a RTG exists between the UL Relay Zone 1 and the UL Relay Zone 2 or between the DL Relay Zone 1 and the DL Relay Zone 2, and a TTG exists between the UL Relay Zone 2 and the UL Access Zone. For the even hop RS, a TTG exists between the UL Relay Zone 2 and the UL Access Zone or between the DL Relay Zone 1 and the DL Relay Zone 2. For the even hop RS, a TTG exists between the UL Relay Zone 1 and the UL Relay Zone 2 or between the DL Relay Zone 1 and the DL Relay Zone 2, and a RTG exists between the DL Relay Zone 2 and a second DL Access Zone.

Multi-hop can be implemented by the relay in the above two approaches, thereby extends the coverage area of a wireless access system.

Hereinafter is described a system for wireless transmission by using a frame structure supporting relay according to an embodiment of the present invention, the system including a base station, a relay and user equipment.

For the base station, Hybrid Zones are set in each subframe, i.e., the Hybrid Zones replace the Relay Zones. Therefore, each subframe is composed of a first DL Access Zone, a UL Hybrid Zone, a UL Access Zone, a DL Hybrid Zone, and a second DL Access Zone. For the relay, each subframe is composed of a first DL Access Zone, a UL Relay Zone, a UL Access Zone, a DL Relay Zone, and a DL Access Zone.

Particularly, in the downlink direction, the BS performs frequency division multiplex in the relay link and the access link in the DL Hybrid Zone, i.e., the BS allocates a part of bandwidth of the Hybrid zones to the relay link. Therefore, the BS may transmit data in the DL Hybrid Zone to the UE and the RS respectively in the coverage area of the BS in a FDM manner, the RS demodulates and decodes the data from the BS upon receiving the data at a corresponding frequency resource, determines a corresponding destination address, encodes and modulates the data in a proper position of the DL Access Zone, and then forwards the data to a corresponding UE; in the uplink direction, the UE transmits data in the UL Access Zone to the RS, the RS demodulates and decodes the data upon receipt, determines a corresponding destination address, and transmits the data to the BS in the frequency resource allocated by the BS to the RS in the UL Hybrid Zone, and the UE also transmits data in a frequency division multiplex manner to the BS with the RS.

In addition, if a system includes a plurality of relays, an embodiment of the present invention provides two approaches supporting multi-hop relay: an intra-subframe relay and an intra-frame relay. Each RS may operate in either of the approaches but not necessarily operate in the two approaches simultaneously.

The first approach, i.e., the intra-subframe relay, allows the BS or RS to transmit, receive or be idle in the Relay Zone. In the downlink direction, an odd hop RS transmits data in the DL Relay Zone of an even subframe to a next hop RS, and the BS and an even hop RS transmits data in the DL Relay Zone of an odd subframe to a next hop RS. In the uplink direction, an odd hop RS transmits data in the UL Relay Zone of an odd subframe to a back hop RS (or BS), and an even hop RS transmits data in the UL Relay Zone of an even subframe to a back hop RS.

The second approach, i.e., the intra-frame relay, allows multi-hop relay in a single subframe. In the uplink direction, an odd hop RS transmits data in the UL Relay Zone 2 to a back hop RS or BS, and an even hop RS transmits data in the UL Relay Zone 1 to a back hop RS. In the downlink direction, an even hop RS (or BS) transmits data in the DL Relay Zone 1 (or the DL Hybrid Zone) to a next hop RS, and an odd hop RS transmits data in the DL Relay Zone 2 to a next hop RS.

It can be seen that in the above system, the broad bandwidth of the B3G system is sufficiently utilized, and frequency division multiplex of the access link and the relay link in the Hybrid Zones is utilized for data transmission, which not only improves flexibility of the system but also sufficiently utilizes time and frequency resource of the system. Also, multi-hop relay can be supported if the system includes a plurality of relays.

The above description is merely preferred embodiments of the present invention, which shall not limit the scope of the present invention. Any variations, equivalents and modifications made within the spirit and principle of the present invention shall fall into the scope of the present invention.

What is claimed is:

1. A method for wireless transmission by using a frame structure supporting Relay, wherein time slots of a subframe is divided into a plurality of zones, and data transmission is performed in a time division multiplex manner, and the method further comprises:
    setting at least one time slot in the subframe as a hybrid zone; and
    performing the data transmission in a frequency division multiplex manner in the hybrid zone;
    wherein if a plurality of relays exist, a base station or a relay supports multi-hop by transmitting data, receiving data or being idle in a relay zone;
    wherein the multi-hop relay is supported partially in the following manner:
    in the downlink direction, an odd hop relay transmits data in a downlink relay zone of an even subframe to a next hop relay, and the base station and an even hop relay transmits data in a downlink relay zone of an odd subframe to a next hop relay;
    in the uplink direction, an odd hop relay transmits data in an uplink relay zone of an odd subframe to a back hop relay or base station, and an even hop relay transmits data in an uplink relay zone of an even subframe to a back hop relay; and
    wherein a relay supports multi-hop relay by operating in an intra-frame relay approach.

2. The method according to claim 1, wherein in the hybrid zone, the frequency division multiplex manner is utilized in a relay link and an access link.

3. The method according to claim 1, wherein a non-transparent relay receives synchronization information and control information sent from a base station in a downlink relay zone.

4. The method according to claim 1, wherein a transparent relay receives synchronization information and control information sent from a base station in a first downlink access zone.

5. The method according to claim 1, wherein performing the data transmission partially in the following manner:
    in the downlink direction, the base station transmits data in the hybrid zone to user equipment and the relay respectively in a frequency division multiplex manner.

6. The method according to claim 1, wherein performing the data transmission partially in the following manner:
    in the uplink direction, the relay and user equipment transmits data in the hybrid zone to the base station simultaneously in a frequency division multiplex manner.

7. The method according to claim 1, wherein the multi-hop relay is supported in the following manner:
    in the downlink direction, an even hop relay transmits data in a first downlink relay zone to a next hop relay or a base station transmits data in a downlink hybrid zone to a next hop relay, and an odd hop relay transmits data in a second downlink relay zone to a next hop relay; and
    in the uplink direction, an odd hop relay transmits data in a second uplink relay zone to a back hop relay or base station, and an even hop relay transmits data in a first uplink relay zone to a back hop relay.

8. A system for wireless transmission by using a frame structure supporting Relay, comprising a base station, a relay and user equipment, wherein
    the base station transmits data in a hybrid zone of a downlink subframe to the user equipment and the relay respectively in a frequency division multiplex manner;

the relay transmits data in a hybrid zone of an uplink subframe to the base station at a frequency allocated by the base station; and the user equipment transmits data to the base station in a frequency division multiplex manner with the relay in the hybrid zone of the uplink subframe wherein if a plurality of relays exist, the base station or a relay supports multi-hop by transmitting data, receiving data or being idle in a relay zone;

wherein the multi-hop relay is supported partially in the following manner:

in the downlink direction, an odd hop relay transmits data in a downlink relay zone of an even subframe to a next hop relay, and the base station and an even hop relay transmits data in a downlink relay zone of an odd subframe to a next hop relay;

in the uplink direction, an odd hop relay transmits data in an uplink relay zone of an odd subframe to a back hop relay or base station, and an even hop relay transmits data in an uplink relay zone of an even subframe to a back hop relay; and wherein a relay supports multi-hop relay by operating in an intra-frame relay approach.

9. The system according to claim 8, wherein in the hybrid zone, a relay link and an access link are frequency division multiplexed with each other.

10. The system according to claim 8, wherein the system supports multi-hop relay in the case that the relay operates in an intra-subframe relay approach and in an intra-frame relay approach.

11. A base station, comprising: a setting unit, a transmitting unit and a receiving unit, wherein the setting unit is configured to set at least one time slot of a subframe as a hybrid zone;

the transmitting unit is configured to transmit data in a hybrid zone of a downlink subframe to user equipment and a relay in a frequency division multiplex manner; and the receiving unit is configured to receive data sent from the relay or data that is frequency division multiplexed by the relay and the user equipment in a hybrid zone of an uplink subframe;

wherein if a plurality of relays exist, the base station or a relay supports multi-hop by transmitting data, receiving data or being idle in a relay zone;

wherein the multi-hop relay is supported partially in the following manner:

in the downlink direction, an odd hop relay transmits data in a downlink relay zone of an even subframe to a next hop relay, and the base station and an even hop relay transmits data in a downlink relay zone of an odd subframe to a next hop relay;

in the uplink direction, an odd hop relay transmits data in an uplink relay zone of an odd subframe to a back hop relay or base station, and an even hop relay transmits data in an uplink relay zone of an even subframe to a back hop relay; and wherein a relay supports multi-hop relay by operating in an intra-frame relay approach.

* * * * *